United States Patent Office 3,770,854
Patented Nov. 6, 1973

3,770,854
PROCESS FOR PREPARING PHOSPHOROTHIONYL DISULPHIDES
Arthur Leslie Morris, Didcot, Terence Colclough, Wantage, and Ronald Brookes, Drayton, England, assignors to Esso Research and Engineering Company
No Drawing. Filed Mar. 23, 1971, Ser. No. 127,337
Claims priority, application Great Britain, Mar. 31, 1970, 15,187/70
Int. Cl. C07d 105/04; C07f 9/16
U.S. Cl. 260—985
6 Claims

ABSTRACT OF THE DISCLOSURE

Phosphorothionyl disulphides useful as ashless lubricating oil additives (antioxidant, anti-wear and extreme pressure additives) are prepared by reacting a thiophosphoric acid with an organic compound containing the group $>S=O$ (e.g. a sulphoxide), preferably at a temperature lower than 140° C.

---

This invention relates to a process for the preparation of phosphorothionyl disulphides.

Phosphorothionyl disulphides are useful as ashless lubricating oil additives where they function as good antioxidant, antiwear and extreme pressure additives. They are also useful as antioxidants in rubbers and plastics and as fuel oil and gasoline additives.

According to this invention phosphorothionyl disulphides are made by reacting a thiophosphoric acid with 0.45 to 0.75 mole per mole of acid, of an organic compound containing the group $>S=O$, preferably at a temperature lower than 140° C. In this reaction, e.g. for sulphoxides,

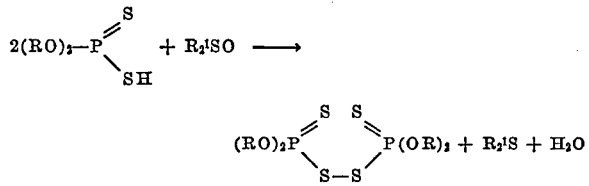

water is evolved, and since thiophosphoric acids are very susceptible to hydrolysis by water, the disulphide product obtained is very impure. The impurities in the product can cause discolouration of copper alloys when the product is used as a lubricating oil additive. In addition the impure product has a high acid number and has poor storage stability.

Surprisingly it has been found that the risk of hydrolysis of the thiophosphoric acid can be more or less eliminated by the use of the preferred process of the invention. In the preferred embodiment of this invention a phosphorothionyl disulphide is prepared by a process wherein a thiophosphoric acid is reacted with 0.45 to 0.75 mole per mole of acid, of an organic compound containing the group $>S=O$, in the presence of a non-polar solvent (as hereinafter defined) and at a temperature not exceeding 75° C.

The thiophosphoric acid has the general formulae

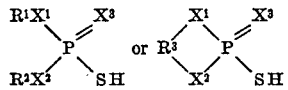

in which $R^1$ and $R^2$ are monovalent hydrogen- and carbon-containing groups, $R^3$ is a divalent hydrogen- and carbon-containing group, $X^1$, $X^2$, and $X^3$ are oxygen or sulphur, sulphur being preferred for $X^3$ and oxygen being preferred for $X^1$ and $X^2$. The groups $R^1$ and $R^2$ are usually, but need not necessarily be, the same. The groups $R^1$ and $R^2$ can be aliphatic or aromatic, e.g. they may be the hydrocarbyl groups such as alkyl, aryl, alkaryl, or aralkyl. If alkyl the groups $R^1$ and $R^2$ preferably contain between 1 and 25 carbon atoms. Suitable aryl groups include phenyl, naphthyl, and anthranyl. Suitable alkaryl groups are alkyl phenyl, the alkyl portion being $C_1$ to $C_{18}$, e.g. tolyl, xylyl, nonyl phenyl, dodecyl phenyl, octadecyl phenyl, dibutyl phenyl, butyl pentyl phenyl and dinonyl phenyl. Aralkyl groups which are suitable include benzyl, 2-phenyl butyl, and 2-phenyl ethyl.

As an alternative to being hydrocarbyl, the groups $R^1$ and $R^2$ may contain oxygen atoms, e.g. they may be alkoxyalkyl, for instance methoxybutyl, or alkoxyaryl, e.g. ethoxyphenyl, or aryloxyalkyl, e.g. phenoxyethyl.

The divalent group $R^3$ may be aromatic or aliphatic. Thus, it may be for example phenylene, bisphenylene or their alkylated derivatives in which case the thiophosphate is derived from catechol, resorcinol, bisphenol or their alkylated derivatives or their thio analogues.

Alternatively, the divalent group $R^3$ can be a group represented by the formula

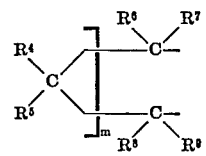

wherein $R^4$, $R^5$, $R^6$, $R^7$, $R^8$ and $R^9$ are hydrogen or hydrogen- and carbon-containing groups, and $m$ is zero (in which case the two carbon atoms linked to the groups $R^6$, $R^7$, $R^8$ and $R^9$ are themselves linked directly together) or an integer, $m$ preferably being zero or an integer of from 1 to 6. The thiophosphoric acids of this type are thus derived from diols or dithiols wherein the carbon atoms bearing —OH and/or —SH groups are contiguous or separated by $m$ carbon atoms. Preferably the groups $R^4$ to $R^9$ inclusive contain only carbon and hydrogen atoms, i.e. they are hydrocarbyl groups, e.g. alkyl, aryl, alkaryl, aralkyl, alicyclic, or alkenyl groups. These groups $R^4$ to $R^9$ preferably contain 1 to 6 carbon atoms e.g. methyl or ethyl. Particularly suitable diols from which the thiophosphoric acids are derived are 2-methylpentane-2,4-diol; butane-2,3-diol; 2 ethyl hexane-1,3-diol; hexane 1,6-diol and 2,2-diethyl propane-1,3-diol.

The hydrogen- and carbon-containing groups $R^1$, $R^2$, and $R^3$ are preferably hydrocarbyl groups, i.e. contain no atoms other than carbon and hydrogen. If desired however these groups $R^1$, $R^2$ and $R^3$ may also be substituted by polar substituents, e.g. chloro, bromo, keto, ethereal, aldehydo or nitro atoms or groups. Preferably these polar substituents are not present in proportions sufficiently large to alter significantly the hydrocarbon character of the group, e.g. they contain no more than 10% by weight of polar substituent based on the hydrocarbyl portion of the group.

The preferred thio phosphoric acids are the dithiophosphoric acids, i.e. ones where $X^1$ and $X^2$ are oxygen and $X^3$ is sulphur.

The organic compound containing the radical $>S=O$ includes organic sulphoxides, organic sulphones, organic thiosulphonates, organic sulphinates and organic thiosulphinates. Of these types of compounds the preferred are the organic sulphoxides, especially the aliphatic sulphoxides e.g. the di-alkyl sulphoxides although the diaralkyl, alkylaryl or diaryl sulphoxides may be used if desired.

Suitable organic sulphoxides include dimethyl sulphoxide, diethylsulphoxide, tetramethylene sulphoxide, cyclohexyl methyl sulphoxide, dibenzyl sulphoxide, benzyl methyl sulphoxide, di-isopropyl sulphoxide, and di-n-butyl sulphoxide.

Examples of other organic compounds containing the radical >S=O are dimethylthiosulphonate, dimethylsulphinate, diethylsulphinate, dimethylthiosulphinate, diethylthiosulphinate and methylethylthiosulphinate.

In the preferred process of this invention it is essential that the reaction be carried out in the presence of a non-polar solvent, by which term we mean a solvent in which water is substantially insoluble. This will ensure minimum contact between water and the unreacted thiophosphoric acid thus minimising the possibilities of hydrolysis of the acid.

Examples of non-polar solvents are the paraffinic or aromatic hydrocarbons, e.g. hexane, octane, cetane, decane, benzene, toluene, xylenes, petroleum ethers, cyclohexane, and mineral oils. Also suitable are halogenated hydrocarbons, e.g. chloroform, chlorobenzene, carbon tetrachloride and trichloroethylene. Also it is possible to use ethers, e.g. dimethyl ether, diethyl ether and ethyl methyl ether, but they are not so suitable as the paraffinic or aromatic hydrocarbons.

In order to prevent any hydrolysis taking place during the reaction it is essential that the reaction temperature should not be allowed to rise above 75° C., and preferably not above 60° C., e.g. a maximum temperature in the range 50° to 60° C.

The process of the invention can be carried out by adding the thiophosphoric acid to the organic compound containing the radical >S=O, or vice-versa. One of the reactants can be dissolved in the non-polar solvent. Thus, a convenient method is for the compound containing the radical >S=O to be added to the phosphoric acid dissolved in solvent since the same reaction vessel can then be used for making the thiophosphoric acid and the phosphorothionyl disulphide. However, it is often possible for the acid to be added to the >S=O containing compound, and very often in the absence of solvents.

The compound containing the radical >S=O should preferably be added in slight excess over stoichiometric, e.g. 5 to 10 wt. percent excess that is 0.525 to 0.550 mole per mole of thiophosphoric acid, so as to ensure complete oxidation of the thiophosphoric acid to disulphide. When the compounding containing the radical >S=O is reacted with the thiophosphoric acid the reaction temperature should be kept below 75° C., preferably below 60° C., by either cooling the reaction vessel or adding the compound containing the radical >S=O slowly.

The removal of the water can be carried out by the use of a drying agent such as anhydrous sodium sulphate or a molecular sieve, although in the presence of a non-polar solvent a drying agent is unnecessary and the water can then be removed.

(a) By allowing two layers to separate and draining off the aqueous layer from the layer containing the disulphide in the non-polar solvent and/or (b) By azeotropic distillation. This can be carried out under reflux with a Dean and Stark apparatus which allows the water to be separated out. The solvent and residual sulphide are then distilled off at atmospheric pressure. Residual traces of solvent and sulphide are finally removed by distillation under reduced pressure (e.g. about 50 mm. Hg or lower), or (c) By a straight distillation (without a Dean and Stark trap) at atmospheric pressure or under reduced pressure (e.g. 50 mm. Hg or lower). In this case the water together with the solvent and sulphide are removed.

The disulphides prepared by the process of this invention are very suitable as antioxidants, antiwear and extreme pressure additives for lubricating oils. Also they are suitable as fuel oil additives.

Suitable lubricating oils include animal, vegetable or mineral oils, for example petroleum oil fractions ranging from spindle oil to SAE 30, 40 or 50 lubricating oil grades; castor oil, fish oils, oxidised mineral oil or brightstocks. The lubricant may be a synthetic ester oil, e.g. diesters such as those prepared by esterifying carboxylic acids such as adipic or sebacic acid with monohydric alcohols, or complex esters obtained by the esterification of a polyhydric alcohol (e.g. a polyglycol) with a dibasic acid (e.g. sebacic or adipic acid) and a monohydric alcohol (e.g. 2-ethyl hexanol or a $C_8$ oxo alcohol).

The preferred quantity of phosphorothionyl disulphide added to the lubricating oil is a minor proportion by weight such as between 0.01 and 10%, e.g. between 0.1 and 5% by weight, based on the total weight of the oil plus disulphide.

Suitable fuel oils to which the disulphides may be added as an antioxidant include liquid hydrocarbon fuel oils, for example a petroleum distillate fuel oil boiling above 200° C. and including light fuel oils, gas oils used as fuel for diesel engines, heavy oils used in furnaces, kerosene, diesel fuels and residual fuels. Also they may be added to gasolines as pre-ignition preventives.

The preferred quantity of phosphorothionyl sulphide added to the fuel oil is a minor proportion by weight such as between 0.001 and 5% by weight, e.g. between 0.005% and 0.5% by weight based on the total weight of the fuel oil composition.

Other additives, for example detergents (e.g. calcium sulphontes) or V.I. improvers (e.g. vinyl acetate/fumarate copolymers) may be added to the lubricating oil or fuel oil.

The phosphorothionyl disulphide can also be used as an antioxidant for plastics e.g. polypropylenes.

EXAMPLE 1

(a) Preparation of the dithiophosphoric acid 968 g. of nonyl phenol was heated with 222 g. of phosphorus pentasulphide at 135–145° C. for 30 to 60 minutes until all the phosphorus pentasulphide had dissolved. The product was dinonylphenyl dithio phosphoric acid.

(b) Preparation of di-nonyl phenyl phosphorothionyl disulphide

The acid produced in (a) above was cooled to 30° C. and 300 ml. of a paraffinic hydrocarbon solvent (B.P. 70°–90° C.) was added.

86 g. of dimethyl sulphoxide was added with stirring and the temperature rose to about 55° C. A Dean and Stark trap was fitted to the reaction vessel, and 15 ml. water (>90% yield) was collected on refluxing. The solvent and remaining dimethyl sulphide were then removed by straight distillation at 50° C. with the pressure initially atmospheric and finally under reduced pressure at 15 mm. Hg, leaving 1280 g. of product.

The disulphide obtained by this method had SAN=2, ASTM D-130 copper corrosion (1% in mineral oil), of J2.

EXAMPLE 2

Di-nonylphenyl dithiophosphoric acid was prepared as in Example 1(a) from 484 g. nonylphenol and 111 g. phosphorus pentasulphide.

This acid was cooled to 25° C. and without solvent present, 43 g. dimethyl sulphoxide was added over 1 hour so that the temperature did not rise above 50° C. Dimethyl sulphide and water were then removed under reduced pressure (4 mm.) with the temperature gradually being increased from 50 to 90° C.

The disulphide prepared in this way had SAN 48 copper corrosion value J9.

EXAMPLE 3

(a) Preparation of di-cresyldithiophosphoric acid 464 g. of a mixture of isomeric cresols was heated with 222 g. phosphorus pentasulphide at 120–130° C. for 15–30 minutes until all the phosphorus pentasulphide had dissolved.

(b) Preparation of di-cresylphosphorothionyl disulphide

The acid produced in Example 3(a) was cooled to 25° C. and 450 ml. of a paraffinic hydrocarbon solvent (B.P. 40–60° C.) added. 86 g. dimethyl sulphoxide was added over 30 minutes which caused the solvent to reflux gently and maintain the temperature below 45° C. A lower aqueous layer was then allowed to separate out and was drained off. The remainder of the water, together with solvent and dimethyl sulphide were distilled off at atmospheric pressure (B.P. 40–60° C.) and finally stripped at 4 mm. pressure (80° C.), leaving 660 g. of the product.

The disulphide prepared in this way had SAN 1 and copper corrosion value J5.

EXAMPLE 4

(a) Preparation of an aliphatic dithiophosphoric acid 222 g. phosphorus pentasulphide was added portionwise over 30–60 minutes to 340 isobutanol in 580 ml. of a paraffinic hydrocarbon solvent (B.P. 70–90° C.) while under gentle reflux, which was contained until all the phosphorus pentasulphide had dissolved, leaving a clear solution of the dithiophosphoric acid.

(b) Preparation of di-isobutylphosphorothionyl disulphide

The acid prepared in 4(a) was cooled to 25° C. and 86 g. dimethyl sulphoxide added. The temperature rose to 70° C. A Dean and Stark apparatus was fitted and 15 ml. water was removed on reflux. The solvent and dimethyl sulphide were then removed by distillation, initially at 80° C./760 mm. and finally at 80° C./15 mm., leaving 580 g. of product, mainly disulphide.

The disulphide prepared in this way had nil SAN.

The strong acid numbers (SAN) were determined throughout by titration with tetrabutyl ammonium hydroxide under non-aqueous conditions.

EXAMPLE 5

Preparation of di-nonylphenyl phosphorothionyl disulphide

The procedure of Example 1(a) was repeated using the same quantities of reactants, and the acid produced was cooled to ambient temperature and added with stirring to 86 g. dimethyl sulphoxide in the absence of any solvent. The temperature rose to about 55° C. The dimethylsulphide was removed under reduced pressure (20 mm./80° C.). Some of the water produced in the reaction was removed during stripping, and a clear product was obtained on filtration using filter-aid.

The disulphide prepared in this way had SAN=0.7 mg./KOH/g. and copper corrosion value (ASTM D–130) of J2.

EXAMPLE 6

Preparation of di-cresylphosphorothionyl disulphide

The procedure of Example 3(a) was repeated using the same quantities of reactants, and the di-cresyldithiophosphoric acid thus prepared was cooled to ambient temperature, and then added with stirring to dimethylsulphoxide (86 g.) in 150 ml. of a hydrocarbon solvent (B.P. 70–90° C.). The solvent, dimethyl sulphide and water, were stripped off (80–90° C./15 mm.) leaving the disulphide with SAN=1.3 mg. KOH/g. and copper corrosion value J5.

What is claimed is:

1. A process for preparing a phosphoronyl disulphide which comprises the reaction of one mole of a thiophosphoric acid with from 0.45 to 0.75 mole of an organic compound containing the group $>S=O$, said reaction being conducted in the presence of a non-polar solvent at a temperature not exceeding 75° C., said thiophosphoric acid having the formula $$\begin{array}{c} R^1X^1 \quad X^3 \\ \diagdown \parallel \\ P \\ \diagup \diagdown \\ R^2X^2 \quad SH \end{array}$$

or the formula $$\begin{array}{c} X^1 \quad X^3 \\ \diagup \diagdown \parallel \\ R^3 \quad P \\ \diagdown \diagup \diagdown \\ X^2 \quad SH \end{array}$$

wherein in each formula $X^1$, $X^2$ and $X^3$ are oxygen or sulphur; $R^1$ and $R^2$ are alkyl or from 1 to 25 carbon atoms, alkyl phenyl wherein the alkyl portion from 1 to 18 carbon atoms, or phenyl, naphthyl or anthranyl; and $R^3$ is a divalent radical selected from the group consisting of phenylene, bisphenylene, and alkylene of from 2 to 8 carbon atoms, said organic compound that contains the group $>S=O$ being selected from the group consisting of dimethyl sulphoxide, diethylsulphoxide, tetramethylene sulphoxide, cyclohexyl methyl sulphoxide, dibenzyl sulphoxide, benzyl methyl sulphoxide, diisopropyl sulphoxide, di-n-butyl sulphoxide, dimethylthiosulphonate, dimethylsulphinate, diethylsulphinate, dimethylthiosulphinate, diethylthiosulphinate and methylthiosulphinate.

2. A process as claimed in claim 1 wherein the organic compound containing $>S=O$ group is dimethyl sulphoxide.

3. A process as defined by claim 1 wherein one mole of thiophosphoric acid is reacted with from 0.525 to 0.55 mole of organic compound containing the $>S=O$ group.

4. A process as claimed in claim 1 where the thiophosphoric acid is a dithiophosphoric acid.

5. A process as claimed in claim 1 wherein the solvent is a paraffinic or aromatic hydrocarbon.

6. A process as claimed in claim 1 wherein the reaction temperature does not rise above 60° C.

References Cited

UNITED STATES PATENTS 1,763,852    6/1930    Johnson _____ 260—926

OTHER REFERENCES

Amonoo-Neizer et al. "J. of Chem. Soc.," August 1965, pp. 4296–4300.

ANTON H. SUTTO, Primary Examiner

U.S. Cl. X.R.

44—76, DIG. 4; 252—46.6; 260—398.5, 926, 927 R